(No Model.)
J. D. NIX.
GRAIN BINDER.
No. 307,577.
3 Sheets—Sheet 1.
Patented Nov. 4, 1884.
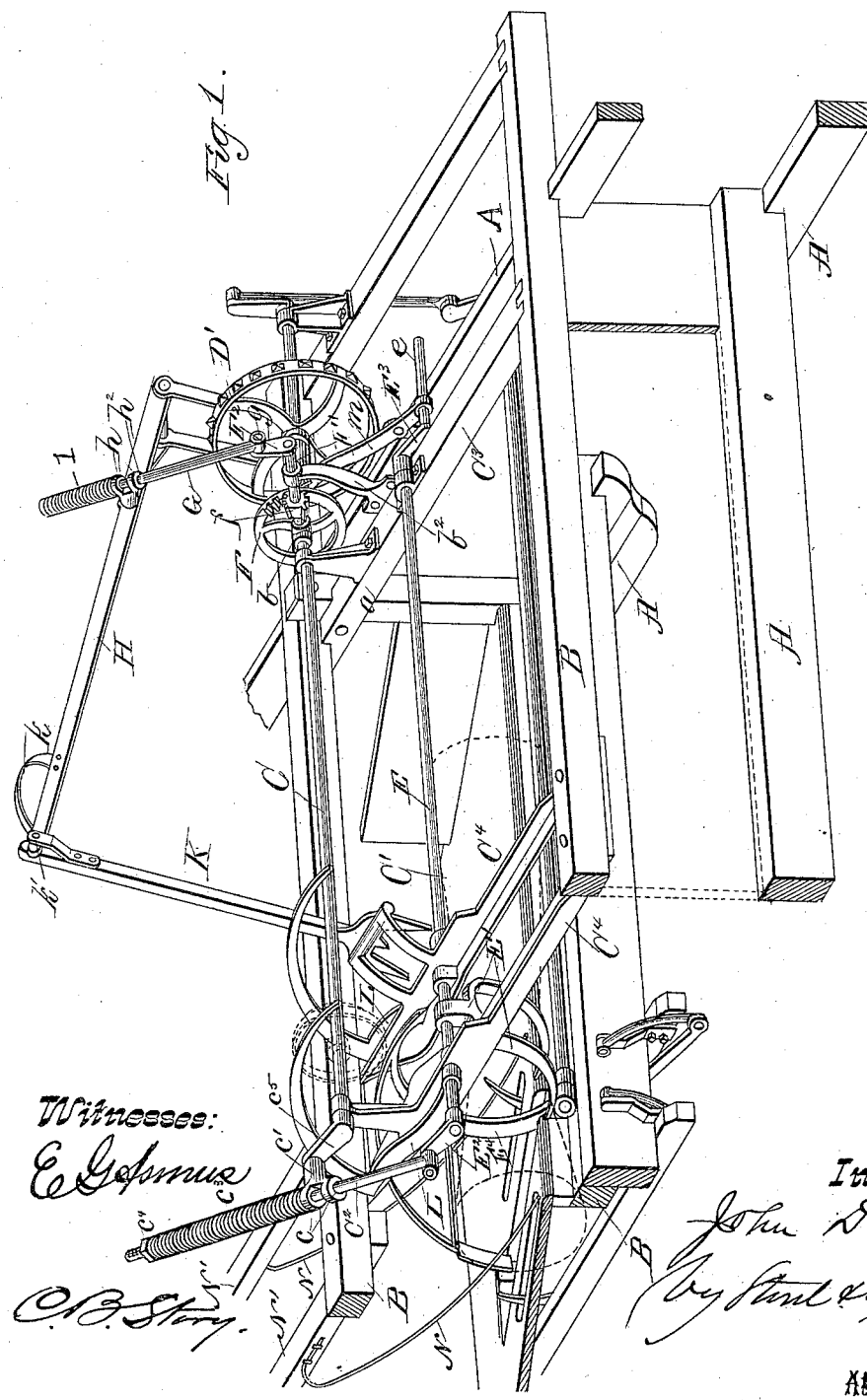
Witnesses:
E. Gesmus
O. B. Storry.
Inventor:
John D. Nix,
by Stout & Underwood
Attorneys.

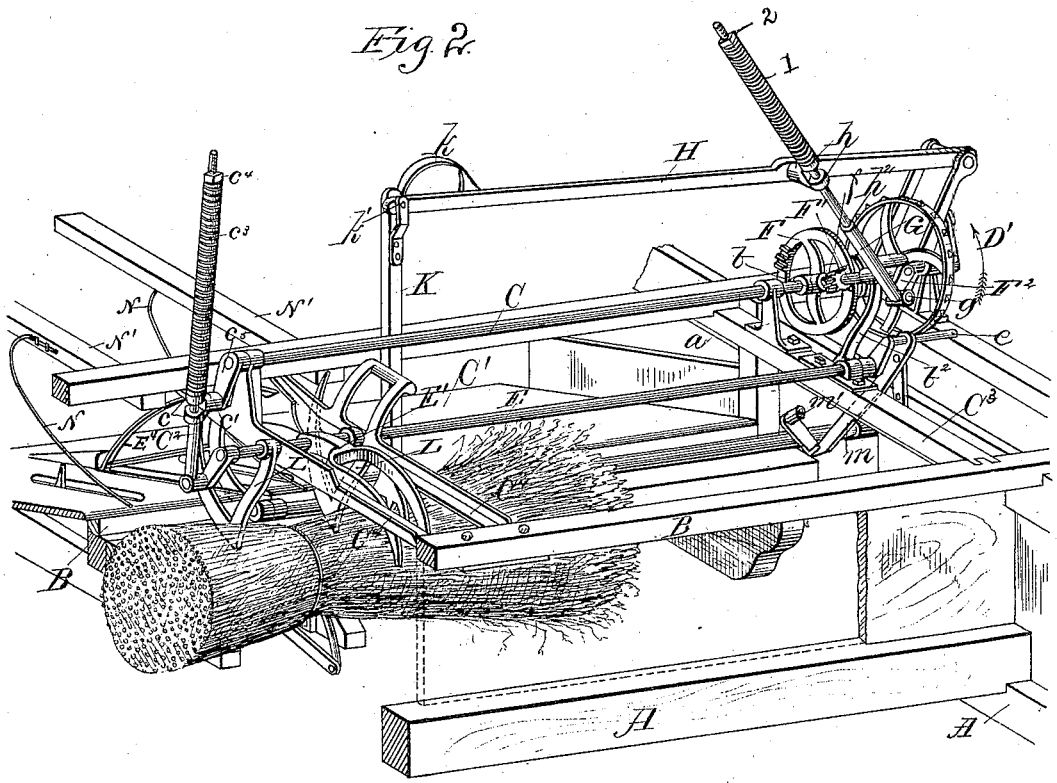

(No Model.)  J. D. NIX.  3 Sheets—Sheet 3.
GRAIN BINDER.
No. 307,577.  Patented Nov. 4, 1884.
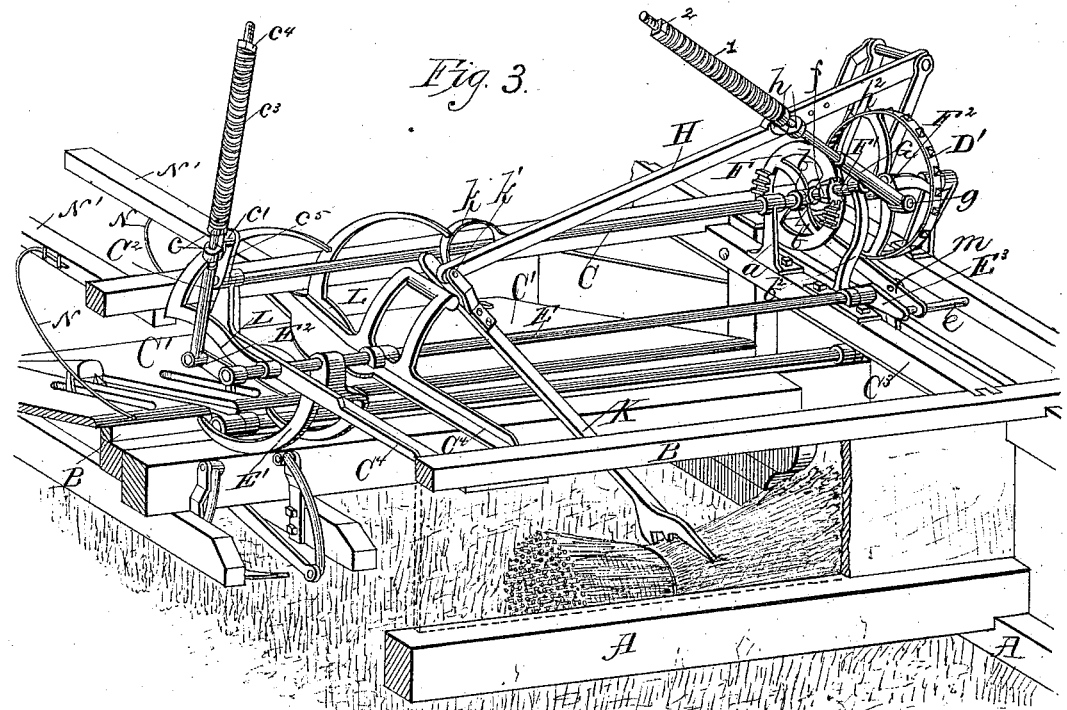
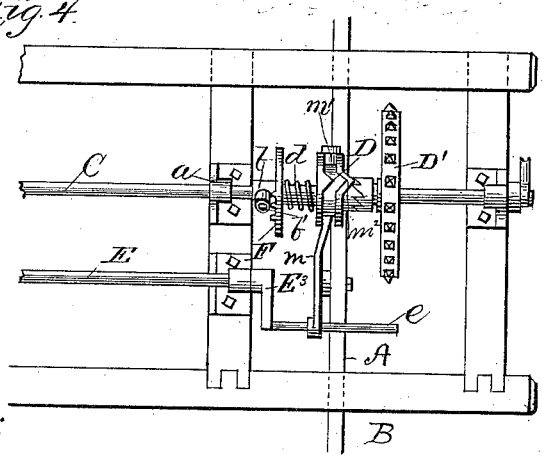

UNITED STATES PATENT OFFICE.

JOHN D. NIX, OF MILWAUKEE, WISCONSIN.

GRAIN-BINDER.

SPECIFICATION forming part of Letters Patent No. 307,577, dated November 4, 1884.

Application filed September 22, 1882. (No model.)

*To all whom it may concern:*

Be it known that I, JOHN D. NIX, of Milwaukee, in the county of Milwaukee, and in the State of Wisconsin, have invented certain new and useful Improvements in Grain-Binders; and I do hereby declare that the following is a full, clear, and exact description thereof.

My invention relates to grain-binders, and will be fully described hereinafter.

In the drawings, Figures 1, 2, and 3 are perspective views of a portion of a grain-binder embodying my invention, Fig. 1 showing the position of the parts after the needle has carried the cord around the gavel, Fig. 2 showing their position just after the tyer has finished its work, and Fig. 3 showing their position immediately after the bundle has been carried from the tyer to the ground, and while it is being held down, so that the machine may clear it in its progress. Fig. 4 is a top view of a portion of my tripping mechanism.

A is the main frame of the machine.

B is a sliding frame, such as described in an application filed of even date herewith, No. 72,481.

C' is the binding-table.

C is the tyer-operating shaft, which is connected at one end with a tripping-shaft, E, by a spring-rod, $C^2$, and crank-arms, and at the other with a spring-clutch, D, all as fully described (though with somewhat different reference-letters) in the application above referred to.

Just inside the spring $d$ that operates the clutch D—that is, causes it to mesh with the teeth on the hub of drive-wheel D'—I place a wheel, F, which, like the clutch D, is splined to shaft C, so as to revolve with it. The inner face of this wheel F has two cog-segments on opposite sides of its axis, and between this wheel and the bearing-standard $a$, I place a loose collar, $b$, on the shaft C; and this collar is made with a bearing-socket, $b'$, extending out from it at right angles to receive one end of an inclined shaft, F', the other end of which bears in bracket $b^2$, and between its two bearings I provide the shaft F' with a miter gear-wheel, $f$, the teeth of which engage with the segmental cogs on wheel F periodically. The outer and upper end of shaft F' carries a crank, $F^2$, the wrist-pin of which has a bearing, $g$, in the lower end of a rod, G, which for part of its length is reduced in size, and this reduced portion projects through an eye or eyes, $h$, of a lever, H, and then receives a spring, 1, followed by a nut, 2, the nut confining the spring between it and the eye or eyes $h$. By reducing that portion of the rod G that passes through the eye $h$, I leave a shoulder, $h^2$, that serves at the proper time to throw the lever H up and carry a fork, K, that is pivoted to its inner end, back to position after it has discharged a gavel. A scroll-spring, $k$, is secured to one side of the lever H, near its inner end, and its free end is extended forward and downward, so as to bear upon the edge of the handle of fork K below its pivot $k'$ and give it (the fork) a tendency to hang at right angles to the lever H. The office of this fork is to take the bundle, after it has been released by the tyer, and carry it down to the ground, there to hold it until the machine has progressed far enough to clear it.

To act in concert with the discharge-lever H, I provide discharge-arms L L, and these are keyed on the tripping-shaft E, that has one bearing in cross-beam $C^3$ and two bearings in metallic frames $C^4$, and between these frames $C^4$, I key the tripper-arm E' to the shaft E. The end of shaft E nearest the tyer is provided with a crank-arm, $E^2$, and its opposite end with another crank-arm, $E^3$. The crank-arm $E^2$ has a wrist-pin, by which the rod $C^2$ is pivoted to it, and this rod $C^2$ passes through eyes $c$ in the loose wrist-pin $c'$ of crank-arm $c^5$ on shaft C, beyond which it extends out to receive first a spiral spring, $c^3$, and then a nut, $c^4$. The crank-arm $E^3$ of shaft E has quite a long wrist-pin, $e$, and this wrist-pin passes through an eye in one end of a lever, $m$, that is pivoted to one of the cross-pieces of the frame A, and the free end of lever $m$ carries a roller or lug, $m'$, that is adapted to fit in the cam-groove in clutch D. This groove extends entirely around the clutch, and has a cam formed in it at $m^2$, which, as the tyer-operating shaft completes a revolution by which a knot is tied, takes against the lug or roller $m'$ and disengages the clutch from the teeth on the hub of the drive-wheel D', and stops the tyer-operating shaft until sufficient grain has again been gathered by the packers to trip the shaft E and cause it to throw the lever m into such a position as to carry the lug m' out of the groove in cam D, when the clutch will be forced back into gear. Now, the tyer-operating shaft will begin to turn again, its crank-arm $c^5$ drawing upon the crank-arm $E^2$ of tripper-shaft E, to cause the tripper-arm E' to compress the grain against the needle $E^4$ as the knot is being tied, and then by the time the knot has been completed one of the cog-segments on wheel F will begin to mesh with the teeth on miter-wheel $f$ on shaft F', turning said shaft and causing its crank-arm to draw upon the rod G, and through rod G draw upon the lever H, which during the tying of the knot has rested in the position shown in Fig. 1, with its fork K suspended over the gavel. Now, as the crank-arm $F^2$ of shaft F' revolves the lever H will be depressed, as before stated, and the fork K, taking into the bundle, will bear it down until it rests upon the ground, as shown in Fig. 3, and hold it until the machine has passed, for during the time it takes for the machine to clear a bundle the miter $f$ is between the two cog-segments on wheel F, and consequently the shaft F' remains stationary until the next segment begins to act upon the miter-wheel, when the crank $F^2$ will be turned far enough to throw the lever H back into the position shown in Fig. 1.

N N are spring-guards which I hang from a frame, N', that projects over the binder-table C'—one on each side of the needle—and these guards project down and inward on a curve until their points rest upon the inner edge of the binder-table, as shown in Fig. 1, and are of metal, and are made yielding, and, while they will permit the grain to be carried under them by the packers, will not permit it to return.

The discharge-arms L L are provided with curved guards, which act as dividers to keep the loose grain away from the tyer until after the bundle has been discharged.

What I claim as my invention, and desire to secure by Letters Patent, is—

1. The combination, in a grain-binder, of lever H, having fork K pivoted thereto, the tyer-operating shaft, a crank actuated thereby, a connecting-rod from said crank reduced in size for part of its length, said reduced portion projecting through an eye on lever H, and having a spring and nut above said eye, whereby the lever and fork are depressed to hold a gavel to the ground, as set forth.

2. The tyer-operating shaft, and its wheel F, the latter having cogged segments on its inner face, in combination with the shaft F', and its miter-gear, the rod G, and the lever carrying a discharging-fork, as set forth.

3. The combination, with the tyer-operating shaft C and tripper-shaft E, of discharge-arms secured to the tripper-shaft, a crank on said tripper-shaft connected by a rod and spring to a crank on the tyer-operating shaft, a crank-arm, $e$, on the shaft E, a lever, $m$, pivoted to the frame and connected to the crank $e$, and the clutch, which is thrown out of engagement by said lever, whereby the tyer-operating shaft and tripper-shaft are made to operate together, substantially as described.

4. The tripper-shaft E, having arms L L secured thereto, the crank $E^2$, and connecting-rod and spring by which said shaft is connected to crank on tyer-operating shaft C, the crank $e$, and lever $m$, connecting the trip-shaft with the cam-groove in the clutch D, all the specified elements combined and operating substantially as described.

5. The lever H and its operating mechanism, substantially as described, combined with fork K, pivoted at the end of said lever, and held to operative position by spring $k$, substantially as described.

In testimony that I claim the foregoing I have hereunto set my hand, on this 22d day of July, 1882, in the presence of two witnesses.

JOHN D. NIX.

Witnesses:
S. S. STOUT,
H. G. UNDERWOOD.